United States Patent Office 2,808,709
Patented Oct. 8, 1957

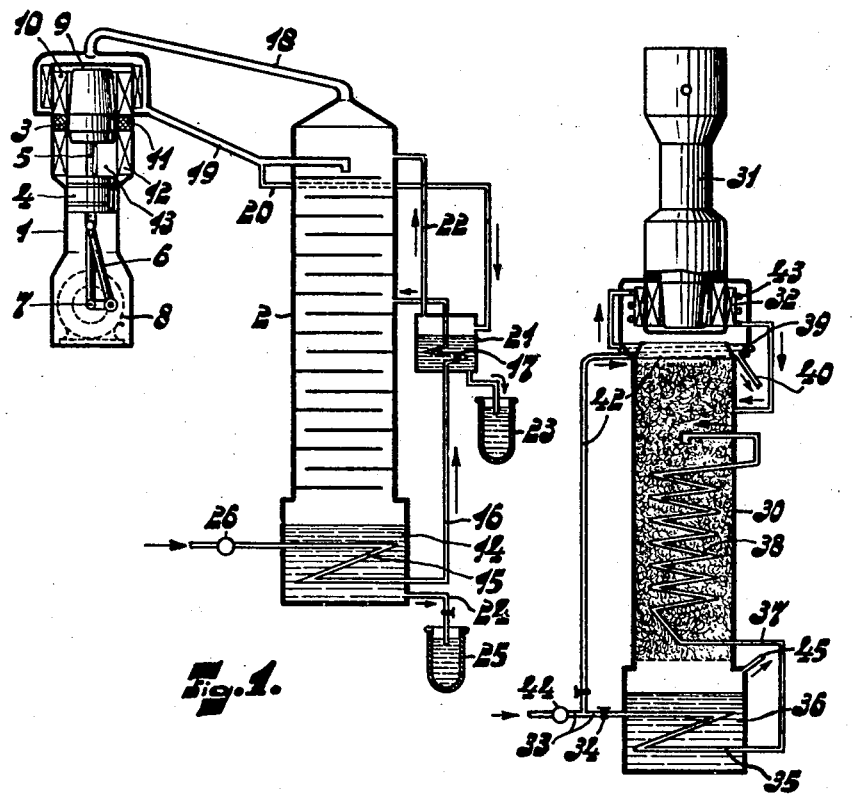

2,808,709

METHOD OF SEPARATING GAS MIXTURES INTO FRACTIONS OF DIFFERENT VOLATILITY

Jacob Willem Laurens Köhler, Eindhoven, Netherlands, assignor, by mesne assignments, to North American Philips Company, Inc., New York, N. Y., a corporation of Delaware Application December 10, 1952, Serial No. 325,101

Claims priority, application Netherlands January 12, 1952

15 Claims. (Cl. 62—122)

This invention relates to methods of separating gas mixtures, more particularly air, into fractions of different volatility.

Several methods are known for separating gas mixtures into different fractions. In such known methods, for example, air compressed to a comparatively high pressure is cooled in a gas fractionating column by the liquid fraction having the highest boiling point and, after its pressure has been reduced, is supplied under such pressure to the gas fractionating column, wherein the air is subsequently separated into fraction viz. oxygen and nitrogen. When employing a so-called half column (i. e. a column without condenser at its upper end, the gas mixture to be separated being supplied at the upper end and a fraction being drawn off at this end) it is possible only to obtain pure oxygen but rather impure gaseous nitrogen. This method suffers from another disadvantage in that at least one-third of the oxygen present in the gas mixture is wasted with the impure nitrogen, so that the column operates uneconomically.

An improvement is found in the so-called single column with which the gas mixture to be separated, for example air, is supplied at the middle of the column and a condenser for condensing the rising fraction, for example nitrogen is provided in the upper part of the column. As a cooling medium for this condenser only the liquid fraction having the highest boiling point, for example oxygen, is available. Since, however, the boiling point of oxygen is higher than that of nitrogen it is necessary either to reduce the boiling point of oxygen or to raise the boiling point of nitrogen. In practice, the last-mentioned step is taken by operating the column under a pressure of approximately 5 atmospheres and by reducing the pressure of the liquid oxygen prior to supplying it to the condenser. In spite thereof the single column does not permit the two fractions to be obtained in a pure state, because the cold produced by the available liquid oxygen is not sufficient for condensing the whole quantity of nitrogen. The production of pure nitrogen simultaneously yields impure oxygen.

In order to avoid this disadvantage the double column has been used. In one part of the column, the high pressure part, a pressure of approximately 5 atmospheres prevails, whereas atmospheric pressure may prevail in the second part, the low pressure part. The condenser of the high-pressure part is the evaporator of the low-pressure part, the latter part having no condenser at its upper side. Such columns are widely used in gas-separation engineering and are designated double Linde column. Although the results achieved by means of such columns are very satisfactory, they have the disadvantage of being complicated and of occupying much space. Another disadvantage is that the air to be separated is required to be compressed.

The present invention has for its object to separate gas mixtures, for example air, in a manner such that the fractions have a high degree of purity and are at least partly liquid, in a gas fractionating column operating under atmospheric pressure and being far less complicated than those hitherto employed for this purpose. In contradistinction to common practice the supplied gas mixture to be separated is not compressed.

According to the invention the gas mixture to be separated is supplied under atmospheric or substantially atmospheric pressure to a gas fractionating column operating under atmospheric or substantially atmospheric pressure, at least part of said mixture being cooled in a heat exchanger in heat exchanging contact with the liquid fraction having the highest boiling point and the cooled gas mixture being supplied to the column at a suitable point between its ends, the gas mixture being subsequently separated into fractions in the column and heat energy being withdrawn at the upper end of the column by means of cold generated by cold gas refrigerating apparatus such that at least part of the separated fractions drawn from the column is liquid.

In the present context, the term "cold gas refrigerating apparatus" is to be understood to mean a refrigerating device comprising at least two chambers whose volumes vary continuously with a substantially constant relative phase difference, one of the chambers having a low temperature and the other having a higher temperature, the chambers connecting with one another through a freezer, a regenerator and a refrigerator and containing a gas of invariable chemical composition which performs a closed thermodynamic cycle and is consistently in one and the same state of aggregation. Such cold gas refrigerating apparatus also include refrigerating devices operating according to the reversed hot-gas engine principle.

In one embodiment of the invention, the sum total of the separated fractions drawn from the column in fractionating air is liquid to at least 40% by weight.

When fractionating air according to the aforesaid method, the oxygen may, for example, be drawn off in the liquid state and nitrogen may be carried off either in the gaseous state or in the liquid state. If the air to be fractionated is of normal composition, the liquid fraction of the nitrogen may at least be 19% by weight of the sum total of the weights of the separated fractions. If desired, exclusively liquid nitrogen may be drawn off.

It may sometimes be desirable that besides a part of the gas mixture cooled in the heat exchanger of the column and subsequently supplied to the column, a second part of the gas mixture not yet cooled in said heat exchanger is cooled by cold from a cold gas refrigerating apparatus, and then supplied to the column.

In a further embodiment of the invention that part of the gas mixture, which has been cooled in the heat exchanger in heat exchanging contact with the liquid fraction having the highest boiling point, is further cooled prior to fractionating it in the column.

Said further cooling may be effected in different ways. Thus, for example, the second cooling operation may take place by means of the fraction drawn from the cold end of the column. In accordance with a further method the second cooling operation of the gas mixture to be fractionated is effected by means from cold gas refrigerating apparatus. In a third method the gas mixture to be separated, which has been cooled in the heat exchanger of the column, is cooled by means of the medium in the column prior to fractionating it in the column. This method is particularly suitable for so-called packed columns which may, for example, be filled with "raschig" rings.

If a fraction is to be drawn off in the liquid state at the upper end of the column it is desirable, in accordance with a further method, for the gaseous fraction at the upper end of the column to be cooled by means of cold from a cold gas refrigerating apparatus to the effect of condensing said fraction, the latter then being partially carried off and another part being again brought into contact with the gas mixture passing upwards in the column.

With the use of the method according to the invention, the fraction at the hot end of the column can be drawn off either as a gas or as a liquid.

The method according to the invention may also be successfully employed if the gas mixture to be separated comprises at least three fractions and a third fraction is to be effected. In accordance with the invention, a quantity of gas containing a quantity of the third fraction is then drawn from the column at a point at which said third fraction is present to a percentage higher than in the gas mixture, said quantity of gas being fractionated in a second column and the third fraction being drawn from the cold end of this column. From this column heat energy is withdrawn by means of cold from a cold gas refrigerating apparatus. If a gas fractionating column comprises an annular duct collecting at least part of the fraction at the upper end of the column it may, in accordance with the invention, be desirable that the gas mixture to be separated, should be cooled by means of the fraction collected in said annular duct.

In order that the invention may be more readily carried into effect, it will now be described in detail with reference to the accompanying drawing representing, by way of example, several forms of installations used for carrying out the method as described, and in which Fig. 1 shows one form, wherein air is fractionated and nitrogen is supplied to a cold gas refrigerating apparatus, spaced apart therefrom, and condensed with this apparatus.

In the installation shown in Fig. 2, the cold gas refrigerating apparatus is placed on top of the column, the freezer being housed in the column itself.

The installation shown in Fig. 3 may be used for extracting a third fraction, for example argon.

The installation shown in Fig. 1 comprises a cold gas refrigerating apparatus 1 and a gas fractionating column 2. A displacer 3 and a piston 4 are adapted to move upwards and downwards with a constant phase difference in the cylinder of the cold gas refrigerating apparatus. To this end, both the displacer 3 and the piston 4 are coupled to a common crank shaft by means of a driving rod mechanism (5, 6 and 7). The refrigerating apparatus is driven by an electric motor 8 coupled to said crank shaft. The space 9 above the displacer 3 is the freezing chamber and is connected by way of a freezer 10, a regenerator 11 and a cooler 12 with the chamber 13, designated the cooled chamber, between the displacer and the piston. On being driven by the motor the temperature of the freezer will fall off to, say, —196° C. at which temperature the refrigerating apparatus delivers cold.

At its lower end, the column is provided with an evaporator 14. The gas mixture to be fractionated, for example air, is supplied under atmospheric or substantially atmospheric pressure and at a temperature which may, for example, be equal to room temperature, say 20° C. Alternatively, however, it may be much lower. The temperature of this air is reduced in a heat exchanger 15 within the evaporator 14, since the air is in heat exchanging contact with the liquid oxygen in the evaporator. The air is subsequently supplied, through a pipe 16 comprising a heat exchanger 17 by means of which the temperature of the air to be fractionated is further reduced, to the gas fractionating column 2, wherein the air is separated into fractions. The evaporator 14 contains oxygen in the liquid state, which is brought to the boiling point by the heat energy resulting from cooling the air to be fractionated, gaseous nitrogen being present in the upper part of the column. Said gaseous nitrogen is supplied through a pipe 18 to the freezer 10 of the cold gas refrigerating apparatus 1, wherein heat energy is withdrawn from the nitrogen to the effect of condensing it, the liquid being fed through a pipe 19 to the column. A part of said liquid nitrogen may be drawn off through a pipe 20 and supplied to a receiver 21 surrounding the heat exchanger 17. In the receiver 21, the liquid nitrogen is in heat exchanging contact with the air in the heat exchanger 17. The gaseous nitrogen thus produced is returned to the column through pipe 22 and liquid nitrogen is collected in a vessel 23. From the evaporator 14 liquid oxygen is drawn through a pipe 24 and collected in a vessel 25. This installation permits of obtaining the fractions without difficulty to a purity of 80% and, when proceeding in accordance with the invention, a purity of 95% and even higher is obtained. Since the air to be separated is to be supplied it will, in general, be desirable to use a small pump 26. However, the air need not be strongly compressed, in contradistinction to the hitherto employed gas fractionating installations. In the present form, the column is a normal single column comprising trays.

The installation shown in Fig. 2 comprises a gas fractionating column 30 and a cold gas refrigerating apparatus 31 corresponding to the cold gas refrigerating apparatus shown in Fig. 1. The refrigerating apparatus is placed on top of the column and the freezer 32 is housed in the column. At variance with the column shown in Fig. 1, the column shown in Fig. 2 is a "packed" column. The gas mixture to be fractionated, for example air, is supplied under atmospheric pressure through a pipe 33 comprising a stop-cock 34 to a heat exchanger 35 within an evaporator 36 of the column. The temperature of the gas mixture is thus reduced and the gas mixture gives off heat energy to the liquid fraction having the highest boiling point and contained in the evaporator 36. The gas mixture is further cooled through a pipe 37 and a heat exchanger 38 provided within the column in heat exchanging contact with the medium in the column, and is subsequently supplied to the column and fractionated.

The fraction having the highest boiling point is collected in the evaporator 36, whereas the fraction having the lowest boiling point is in the upper part of the column, where heat energy is withdrawn by means of the cold gas refrigerating apparatus. The fraction at the upper end of the column condenses on the freezer 32, the condensation product being partially collected in the annular duct 39 and drawn off through a pipe 40.

Another part of the gas mixture to be separated is reduced in temperature and supplied to the column through a pipe 41, a heat exchanger 42 surrounding the annular duct 39 and a heat exchanger 43 surrounding the freezer 32 of the refrigerating apparatus. This installation may also comprise a pump 44 for supplying the gas mixture to be separated and in this case, also, the gas mixture need not be so strongly precompressed as in hitherto known installations. In this form the heat exchanger 38 is situated between the evaporator and the point at which the gas mixture is supplied to the column. As an alternative, however, the pipe 37 may extend in a manner such that the heat exchanger is situated between the point at which the gas mixture is supplied to the column and the cold end of the column. In this case, the gas mixture will at least partially liquefy and thus be supplied to the column.

In this installation, the high-boiling fraction is carried off in the gaseous state through a pipe 45. Both fractions carried off may have a very high degree of purity and, in fractionating air, more than 40% of the sum total of the weights of the separated fractions is liquid.

The installation shown in Fig. 3 may be employed if a third fraction is to be effected. If the gas mixture to be fractionated is air said third fraction may, for example, be argon.

The installation comprises a single gas-fractionating column 50, a second single gas-fractionating column 51 and cold gas refrigerating apparatus 52. The air is supplied under atmospheric or substantially atmospheric pressure through a pipe 53 to a heat exchanger 54 within an evaporator 55 of the column 50. The evaporator contains liquid oxygen with which the air is in heat exchanging contact with the result that the temperature of the air is reduced and the oxygen is brought to the boil. The air thus cooled is supplied through a pipe 56 containing a heat exchanger 57 to the column 50 wherein it is fractionated. The oxygen trickles down in the column and is collected in the evaporator 55. The nitrogen passes upwards and enters a condenser 58 wherein heat energy is withdrawn from the nitrogen so that it condenses, part of the liquid nitrogen being collected in an annular duct 59 and drained off through a pipe 60. At a point of the column, where the argon percentage is sufficiently high, the gas mixture there present and substantially consisting of oxygen and argon is carried off through a pipe 61. This gas mixture is supplied to the column 51 wherein it is again fractionated. The liquid oxygen is collected at the bottom of the column and heat energy is withdrawn from the column in a heat exchanger 62 housed in the upper part of the column. The argon is partially condensed and the gaseous part escapes through a pipe 63, the liquid oxygen at the bottom of the column being again supplied to the column 50 through a pipe 64. Gaseous oxygen is drawn from said column through a pipe 65.

The cold gas refrigerator apparatus is constructed similarly to Fig. 1. The freezer 66 is surrounded by a space 67 which may contain a heat transferring medium, for example, nitrogen. This medium condenses and is passed through a pipe 68 to the condenser 58 where it withdraws heat energy and evaporates, the vapour being returned to the space 67 through a pipe 69. The pipe 68 is connected with a pipe 70 which has a cock 71, and is connected with the condenser 62 of column 51. Through the pipe 70 liquid nitrogen is supplied to the condenser of the second column and the evaporated nitrogen is drained off through pipe 72 to pipe 69. A pipe 73 having a stop cock 74 is connected with the pipe 68. The pipe 73 is connected with the heat exchanger 57 wherein the supplied nitrogen evaporates so that heat energy is withdrawn from the air supplied to column 50, the evaporated nitrogen being carried off through a pipe 75 to pipe 69. The cocks 71 and 74 may be set so that the heat exchangers may be supplied with the desired quantity of nitrogen.

The column 50 is a column comprising trays, whereas column 51 may, for example, be a so-called "packed" column.

In the aforesaid forms, air is separated into fractions. Alternatively, however, other gas mixtures, for example coke oven gas, may be separated into fractions in accordance with the aforesaid methods.

What I claim is:

1. A method of separating a gas mixture into fractions of different volatility comprising the steps of supplying said gas mixture under atmospheric pressure to a gas fractionating column, cooling at least part of said mixture in a heat exchanger in heat exchanging contact with a liquid fraction having the highest boiling point, feeding said cooled mixture to said gas fractionating column at a point between the ends thereof, separating said gas mixture into fractions in said column, and condensing at least a part of the vapor resulting from the fractionating of the gas mixture rising to the top of said column, said condensation being brought about by means of a cold-gas refrigerating apparatus comprising a cylinder, two pistons operating in said cylinder with a constant phase difference and defining two chambers in which a closed thermodynamic cycle is performed by a gaseous medium of invariable chemical composition in one and the same state of aggregation, the volume of gaseous medium in said chambers varying continuously while one of said chambers has a low temperature and the other chamber has a higher temperature, the chambers being connected with one another through a cooler, regenerator and freezer, said cycle being performed independently of said fractionating process.

2. A method of separating a gas mixture into fractions of different volatility as set forth in claim 1 wherein 40% by weight of the sum total of the separated fractions in the column is liquid.

3. A method of separating a gas mixture into fractions of different volatility as set forth in claim 1 wherein the gaseous fraction in the upper part of said column is cooled by means of cold from a cold gas refrigerating apparatus thereby condensing said fraction, a part of said fraction being carried off and another part thereof being again brought into said column.

4. A method of separating a gas mixture into fractions as set forth in claim 1 wherein said part of said mixture that has been fractionated is drawn off as a liquid at the hot end of said column.

5. A method of separating a gas mixture into fractions of different volatility as set forth in claim 1 wherein said gas fractionating column is provided with an annular duct collecting at least part of one fraction in the upper part of the column, said gas mixture to be separated being cooled by means of said part of one fraction contained in said annular duct.

6. A method of separating a gas mixture into fractions as set forth in claim 1 wherein said part of said mixture that has been fractionated is drawn off in the form of a liquid at the hot end of said column.

7. A method of separating a gas mixture into fractions as set forth in claim 1 wherein said gas mixture is separated into three fractions, said third fraction containing a quantity of gas which is drawn from said column at a point at which said third fraction is present to a higher percentage than in said gas mixture, said gas mixture being separated into fractions in a second column wherein said third fraction is drawn from the cold end of said second column, and heat energy being withdrawn from said second column by means of cold from a cold-gas refrigerating apparatus comprising a cylinder, two pistons operating in said cylinder with a constant phase difference and defining two chambers in which a closed thermodynamic cycle is performed by a gaseous medium of invariable chemical composition in one and the same state of aggregation, the volume of gaseous medium in said chambers varying continuously while one of said chambers has a low temperature and the other chamber has a higher temperature, the chambers being connected with one another through a cooler, regenerator and freezer, said cycle being performed independently of said fractionating process.

8. A method of separating a gas mixture into fractions of different volatility comprising the steps of supplying said gas mixture under substantially atmospheric pressure to a gas fractionating column, cooling at least part of said mixture in a heat exchanger in heat exchanging contact with a liquid fraction having the highest boiling point, feeding said cooled mixture to said gas fractionating column at a point between the ends thereof, separating said gas mixture into fractions in said column, condensing at least a part of the vapor resulting from the fractionating of the gas mixture rising to the top of said column, said condensation being brought about by means of a cold-gas refrigerating apparatus cooling a second part of said gas mixture not yet cooled in said heat exchanger by means of cold from said cold-gas refrigerating apparatus, said cold gas refrigerating apparatus comprising a cylinder, two pistons operating in said cylinder with a constant phase difference and defining two chambers in which a closed thermodynamic cycle is performed by a gaseous medium of invariable chemical composition in one and the same state of aggregation, the volume of gaseous medium in said chambers varying continuously while one of said chambers has a low temperature and the other chamber has a higher temperature, the chambers being connected with one another through a cooler, regenerator and freezer, said cycle being performed independently of said fractionating process and supplying said cooled mixture to said column.

9. A method of separating a gas mixture into fractions of different volatility comprising the steps of supplying said gas mixture under substantially atmospheric pressure to a gas fractionating column, cooling at least part of said mixture in a heat exchanger in heat exchanging contact with a liquid fraction having the highest boiling point, feeding said cooled mixture to said gas fractionating column at a point between the ends thereof, separating said gas mixture into fractions in said column, condensing at least a part of the vapor resulting from the fractionating of the gas mixture rising to the top of said column, said condensation being brought about by means of a cold-gas refrigerating apparatus, and said part of said mixture after having been cooled in said heat exchanger being further cooled prior to separating it into fractions in said column, said cold gas refrigerating apparatus comprising a cylinder, two pistons operating in said cylinder with a constant phase difference and defining two chambers in which a closed thermodynamic cycle is performed by a gaseous medium of invariable chemical composition in one and the same state of aggregation, the volume of gaseous medium in said chambers varying continuously while one of said chambers has a low temperature and the other chamber has a higher temperature, the chambers being connected with one another through a cooler, regenerator and freezer, said cycle being performed independently of said fractionating process.

10. A method of separating a gas mixture into fractions of different volatility as set forth in claim 9 wherein said further cooling of said part of said mixture is accomplished by means of the fraction drawn from the cold end of said column.

11. A method of separating a gas mixture into fractions of different volatility as set forth in claim 9 wherein said further cooling of said part of said mixture is effected by means of cold from a cold-gas refrigerating apparatus.

12. A method of separating a gas mixture into fractions of different volatility as set forth in claim 9 wherein said gas mixture to be separated which has been cooled in the heat exchanger of said column is further cooled by means of the medium in said column prior to separating said gas mixture into fractions.

13. A device for separating gas mixtures comprising a rectifying column having an evaporator, a heat exchanger in said evaporator, means for supplying said gas mixture to said heat exchanger and thence to said rectifying column, at least part of said mixture being cooled in said heat exchanger which is in heat exchanging contact with the liquid fraction of the evaporator having the highest boiling point, said evaporator containing oxygen in a liquid state, while gaseous nitrogen is present in the upper part of said column, a cold gas refrigerator, and means connecting said cold gas refrigerator to said column whereby heat energy is withdrawn from said nitrogen to produce liquid nitrogen, said cold gas refrigerator comprising a cylinder, two pistons in said cylinder, means operating said pistons in said cylinder with a constant phase difference whereby two chambers are formed in which a closed thermodynamic cycle is performed by a gaseous medium of invariable chemical composition in one and the same state of aggregation, the volume of gaseous medium in said chambers varying continuously while one of said chambers has a low temperature and the other chamber has a higher temperature, a cooler, a regenerator and freezer connecting said two chambers, said cycle being performed independently of said fractionating process.

14. A device for separating gas mixtures as set forth in claim 13 further comprising a second heat exchanger in said column and wherein the high boiling fraction is carried off from the top of said column in a gaseous state.

15. A device for separating gas mixtures as set forth in claim 13 further comprising a second packed rectifying column, means connecting said rectifying column with said second packed rectifying column, and means connecting said cold gas refrigerator with said second packed rectifying column.

References Cited in the file of this patent

UNITED STATES PATENTS

| | | |
|---|---|---|
| 967,105 | Claude | Aug. 9, 1910 |
| 1,594,336 | Mewes | July 27, 1926 |
| 2,095,809 | Gomonet | Oct. 12, 1937 |
| 2,101,300 | Weil | Dec. 7, 1937 |
| 2,180,715 | Messer | Nov. 21, 1939 |
| 2,417,279 | Van Nuys | Mar. 11, 1947 |
| 2,480,094 | Anderson | Aug. 23, 1949 |
| 2,482,304 | Van Nuys | Sept. 20, 1949 |
| 2,486,081 | Van Weenen | Oct. 25, 1949 |
| 2,530,602 | Dennis | Nov. 21, 1950 |
| 2,627,731 | Benedict | Feb. 10, 1953 |

FOREIGN PATENTS

| | | |
|---|---|---|
| 322,702 | France | Oct. 11, 1902 |
| 339,354 | Germany | July 22, 1921 |